United States Patent [19]

Sagl et al.

[11] Patent Number: 5,147,924
[45] Date of Patent: Sep. 15, 1992

[54] SELECTIVELY SOLUBLE, PROTECTIVE COATING COMPOSITIONS DERIVED FROM VINYL ACETATE/MONOALKYL MALEATE COPOLYMERS

[75] Inventors: Dennis Sagl, Macungie; Menas S. Vratsanos, Breinigsville, both of Pa.

[73] Assignee: Air Products and Chemicals, Inc., Allentown, Pa.

[21] Appl. No.: 657,920

[22] Filed: Feb. 19, 1991

[51] Int. Cl.$^5$ .................. C08L 33/06; C08F 218/08; C08F 220/12
[52] U.S. Cl. .................... 524/559; 526/330
[58] Field of Search ........................ 524/559

[56] References Cited

U.S. PATENT DOCUMENTS

| | | | |
|---|---|---|---|
| 2,806,020 | 9/1957 | Scott et al. | 526/199 |
| 3,960,485 | 6/1976 | Fantl et al. | 8/138 |
| 4,013,607 | 3/1977 | Dwyer et al. | 524/428 |
| 4,013,805 | 3/1977 | Corey et al. | 427/390 |
| 4,540,736 | 9/1985 | Herten et al. | 524/556 |
| 4,562,226 | 12/1985 | Coombes et al. | 524/767 |
| 4,636,543 | 1/1987 | Helton | 524/109 |
| 4,942,193 | 7/1990 | VanBuskirk et al. | 524/276 |

*Primary Examiner*—Joseph L. Schofer
*Assistant Examiner*—Wu C. Cheng
*Attorney, Agent, or Firm*—Keith D. Gourley; James C. Simmons; William F. Marsh

[57] ABSTRACT

The present invention relates to a composition for depositing a temporary, selectively soluble protective coating onto a substrate and a process for using the same. The composition consists essentially of a copolymer consisting of 35 to 85 weight percent vinyl acetate and from 15 to 65 weight percent of a predefined monoalkyl maleate which is dispersed in a solvent/vehicle. The protective coatings deposited therefrom are substantially impervious to aqueous media having acidic or neutral pH and provide an effective barrier against damage to the substrate's surface. At the desired time, the protective coating can be removed from the substrate by dissolution in an aqueous alkaline solution.

12 Claims, No Drawings

SELECTIVELY SOLUBLE, PROTECTIVE COATING COMPOSITIONS DERIVED FROM VINYL ACETATE/MONOALKYL MALEATE COPOLYMERS

TECHNICAL FIELD

The present invention relates to compositions for depositing a temporary, selectively soluble protective coating of a vinyl acetate/monoalkyl maleate copolymer onto a substrate and a process for using the same. The protective coatings formed therefrom are substantially impervious to aqueous solutions having an acidic or neutral pH while easily removable by dissolution in an aqueous alkaline solution.

BACKGROUND OF THE INVENTION

Protective coatings are commonly used to provide temporary protection for painted or polished manufactured articles against weathering, contamination from the atmosphere, chemical attack or accidental damage during handling and storage. Such coatings are applied to the painted or polished surface and are designed for facile removal without deleterious effect upon the surface to be protected.

Protective coatings are commonly used in the automobile industry to protect a newly completed vehicle from damage while being stored out of doors and during transport to the premises of a dealer. Waxes provide useful protective coatings when applied to a newly painted body creating a weatherproof, and to some extent, damage-resistant layer. However, such wax coatings can only be removed by employing an organic solvent, optionally in conjunction with a steam jet, thus involving flammability and/or toxicity hazards and the use of special equipment.

In order to overcome these disadvantages, alternative types of temporary protective coatings have been proposed which can be removed by treatment with solvents which are easier to handle and which do not adversely affect the environment. For example, U.S. Pat. No. 4,013,607 discloses an improved stable self-stripping aqueous coating composition containing as the primary coating agent an alkali soluble resin of low molecular weight and high acid number and aqueous ammonia sufficient to provide a pH of no less than about 9.0. The alkali soluble resin is an addition resin containing at least two ethylenically unsaturated monomers; one of the monomers being a ligand-free monomer such as vinyl acetate, styrene, ethyl acrylate and mixtures thereof, while the other ethylenically unsaturated monomer contains carboxyl functional groups including maleic, fumaric, itaconic and crotonic acids.

U.S. Pat. No. 4,540,736 discloses temporary coating compositions comprising water, a copolymer of ethylene and an α,β-ethylenically unsaturated carboxylic acid having a number average molecular weight of from about 500 to about 5000 and an acid number of at least 100 milligrams of potassium hydroxide necessary to neutralize one gram of copolymer. The invention requires a sufficient amount of a base which is preferably volatile, to form a clear, aqueous liquid composition.

U.S. Pat. No. 4,562,226 discloses aqueous compositions suitable for forming upon a substrate a temporary protective coating which can be removed subsequently by treatment with an aqueous solution. The aqueous solution comprises a sterically stabilized aqueous dispersion of a polymer derived from monomers including at least one acrylic monomer and from 5% to 40%, based on the total weight of monomers, of an ethylenically unsaturated monocarboxylic acid, or an equivalent proportion of an unsaturated polycarboxylic acid.

U.S. Pat. No. 4,942,193 discloses a temporary protective coating for metals comprising a base-neutralized acid or base-functional copolymer which contains wax. Suitable acid-functional monomers are selected from acrylic acid, methacrylic acid, crotonic acid, itaconic acid, maleic acid and the like. Amounts of about 5 to 100 percent by weight of the acid-functional monomer based on the total monomer content can be employed. Typically, amounts of about 10 to 40 weight percent and preferably about 10 to 30 weight percent are employed. Copolymerizable ethylenically unsaturated monomers such as vinyl monomers, e.g., styrene, vinyl toluene and the like, esters of acrylic acid or methacrylic acid such as methyl methacrylates, butyl acrylate and 2-ethylhexyl acrylate, can be employed.

Manufacturers presently seek protective coatings exhibiting improved resistance to neutral aqueous solutions which can be removed at the desired time by treatment with aqueous alkali solutions.

BRIEF SUMMARY OF THE INVENTION

The present invention relates to compositions for depositing a temporary, selectively soluble protective coating onto a substrate. The protective coatings deposited therefrom, which are substantially impervious to aqueous media having acid or neutral pH, provide effective protection against damage caused by weathering, contamination from the atmosphere, chemical attack and accidental damage during handling and storage. The protective coatings can be conveniently removed from the substrate at the desired time by dissolution in an aqueous alkaline solution.

The compositions consist essentially of a vehicle having dispersed therein a copolymer consisting of 35 to 85 weight percent vinyl acetate and from 15 to 65 weight percent of a monoalkyl maleate represented by the formula:

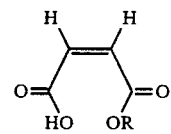

wherein R is selected from an alkyl having from 1 to about 6 carbon atoms.

Also disclosed is a process for protecting the surface of a substrate which comprises depositing the above-mentioned compositions onto the surface of the substrate to be protected; removing the vehicle from the deposited composition to form a temporary, selectively soluble protective coating upon the surface of the substrate wherein the protective coating is substantially insoluble in an aqueous acidic solution; and contacting the protective coating with an aqueous alkaline solution to remove the protective coating from the surface of the substrate.

The compositions of the present invention can be applied by conventional methods to porous and non-porous substrates. Since the protective coatings can be removed by dissolution in an alkaline aqueous solution, the present invention avoids the use of toxic organic solvents which can adversely affect the environment.

DETAILED DESCRIPTION OF THE INVENTION

The present invention provides improved compositions for depositing a temporary, selectively soluble protective coating onto a porous or non-porous substrate and a process for protecting a substrate's surface using such compositions. The protective coatings deposited therefrom are substantially impervious to aqueous media having acidic or neutral pH and provide effective protection against weathering, contamination from atmosphere, chemical attack or accidental damage occurring during handling and storage.

Applicants have discovered that such protective coatings deposited from compositions derived from a copolymer of vinyl acetate and specific monoalkyl maleates possess unexpectedly good resistance to acidic and neutral aqueous solutions. Moreover, the protective coatings deposited from the compositions of this invention exhibit selective solubility wherein such coatings, which are substantially insoluble in acidic media, can be conveniently removed from the substrate at the desired time via dissolution in an aqueous alkaline solution.

The term, selective solubility, as used throughout the Specification and the appended claims, refers to protective coatings which are substantially insoluble in aqueous media having an acidic or neutral pH, but which can be removed at any time by subjecting the protective coating to an alkaline solution for a period of time sufficient to soften and dissolve the protective coating from the surface of the substrate. Therefore, the user can select the desired time in which to conveniently remove the protective coating to unveil a protected, pristine surface of the substrate.

The compositions consist essentially of a vehicle having dispersed therein an effective amount of a copolymer consisting of vinyl acetate and monoalkyl maleate units such that, subsequent to the volatilization of the vehicle/solvent, a continuous copolymeric film having a thickness sufficient to provide the desired protection can be deposited onto the surface of the substrate to be protected. The copolymers of the present invention consist of from 35 to 35 weight percent vinyl acetate and from 15 to 65 weight percent of a monoalkyl maleate, and preferably from 50 to 80 weight percent vinyl acetate and 20 to 50 weight percent of a monoalkyl maleate, wherein the monoalkyl maleate is represented by the formula:

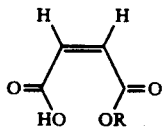

wherein R is selected from a linear or branched alkyl having from 1 to about 6 carbon atoms.

Suitable alkyl groups according to the above-mentioned formula include both linear and branched alkyls such as methyl, ethyl, propyl, isopropyl, butyl, isobutyl, tert-butyl and the like.

The term, vehicle, refers to a solvent or a mixture of solvents in which the above-described copolymers are soluble in amounts sufficient to form a continuous film of copolymer having the desired thickness on the surface of the substrate to be protected following volatilization of the vehicle. The selection of such vehicles is easily ascertained by those skilled in the art. Suitable vehicles include most polar solvents. Representative polar solvents include alcohols having from 1 to about 6 carbon atoms. A preferred vehicle is methanol.

The constituents of the monomer mixture and their relative proportion should be chosen such that the coatings deposited from the claimed compositions exhibit satisfactory film coalescence and physical properties under the desired conditions of application. The compositions according to the present invention typically contain from 5 to about 65 weight percent of the vinyl acetate/monoalkyl maleate copolymer, and preferably from 20 to about 45 weight percent of the vinyl acetate/monoalkyl maleate copolymer based upon the weight of the vehicle. The relative weight percentages of the vehicle and copolymer may vary according to the nature of the substrate to be treated, the desired thickness of the protective coating and the operating environment (i.e., temperature, humidity and the like).

The protective coatings to be deposited from the compositions according to the present invention consist of a copolymer represented by the formula:

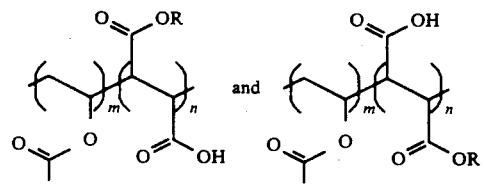

wherein R is selected from a linear or branched alkyl having from 1 to about 6 carbon atoms.

The vinyl acetate/monoalkyl maleate copolymers can be prepared by conventional bulk, solution or emulsion polymerization techniques known in the art. The copolymers should have sufficiently high molecular weight to provide adequate physical properties, particularly toughness and abrasion resistance, without causing excessive viscosity in the coating composition which could hamper the facile deposition of the composition onto the desired substrate.

While the vinyl acetate/monoalkyl maleate copolymers of the present invention can be easily prepared by solution polymerization techniques, the copolymers can also be prepared by emulsion polymerization techniques utilizing suitable emulsifying agents, i.e., protective colloids and surfactants, in an aqueous medium under pressures generally not exceeding about 100 atm and in the presence of a redox system which is added incrementally, the aqueous system being maintained by a suitable buffering agent at a pH of about 2 to 6.

Additives such as defoamers, wetting agents or additional cosolvents may be employed although a distinct feature of this invention relates to the absence or substantial absence of an external surfactant which in certain instances, may cause water sensitivity and impair corrosion resistance.

The protective coatings of the present invention can be applied to the desired substrate by known methods including spraying, brushing, dipping, roller coating, curtain coating and the like. Coating weights of about 0.3 to 4 and preferably about 0.5 to 3 milligrams per square inch can be applied. Those skilled in the art recognize that each substrate to be coated has a surface roughness and porosity unique to itself requiring the deposition of a protective film having a thickness sufficient to provide the desired protective effect. The applied coatings may be air dried, forced dried or baked to remove or volatilize the solvent/vehicle from the composition leaving a hard, impenetrable continuous protective coating on the substrate's surface.

The protective coatings are easily removed at the desired time by contacting the coated substrate with an aqueous alkaline solution. Suitable alkali solutions include aqueous solutions of any alkali source which will not harm the substrate upon removal of the protective coating. Suitable alkali sources include ammonia, sodium bicarbonate, sodium carbonate, sodium hydroxide, potassium hydroxide and the like. A preferred aqueous alkaline solution is distilled water containing from 1 to about 10 weight percent sodium carbonate.

The concentration of the alkaline solution to be used for removing the protective coating will depend upon the thickness of the protective coating, the sensitivity of the substrate to attack by alkali agents, the desired time to be allotted for removing the protective coating as well as the method of dispersing the alkali solution to remove the protective coating. The alkali solution may be delivered to the coated substrate by any known method including spraying, flooding, dipping (immersion) or the like.

The protective coatings of the present invention can be used to protect metallic, plastic and wooden substrates having a wide variety of compositions. Typical substrates suitable for receiving the claimed protective coatings include vehicle bodies, manufactured articles having polished metal surfaces such as stainless steel sink units, articles made form copper, brass or aluminum, plastic-faced working surfaces, plastic baths or sinks and glassware. The compositions may further be used for protecting metal, wood or plastic panels during fabrication and assembly operations.

The process for protecting a surface of a substrate which utilizes the compositions according to this invention comprises depositing the desired vinyl acetate/monoalkyl maleate copolymeric composition onto the surface of the substrate to be protected., removing the vehicle from the deposited composition to form a temporary, selectively soluble protective coating upon the substrate's surface wherein the protective coating is substantially insoluble in an aqueous solution; and contacting the protective coating with an aqueous alkaline solution to remove the protective coating from the surface of the substrate.

The following examples are provided to further illustrate various embodiments and are not intended to restrict the scope of the invention. In the following examples, temperatures are set forth uncorrected in degrees Celsius. Unless otherwise indicated, all parts and percentages are by weight.

EXAMPLES 1-7

PREPARATION OF VARIOUS VINYL ACETATE/MONOALKYL MALEATE COPOLYMERS BY SOLUTION POLYMERIZATION

Various vinyl acetate/monoalkyl maleate copolymers according to Table 1 were prepared using standard solution polymerization techniques. Vinyl acetate and the designated monoalkyl maleate were mixed in methanol with the enumerated initiator and flushed with dry nitrogen. Each reaction mixture was heated to 60° C. under nitrogen for a period of 20 hours. The resulting copolymers were precipitated in water. Following drying, the respective products were recovered and the compositions were verified by $^{13}C$ NMR.

TABLE 1

COMPOSITION OF VARIOUS VINYL ACETATE MONOALKYL MALEATE COPOLYMERS PREPARED ACCORDING TO EXAMPLES 3-9

| Example | Vinyl Acetate (g) (mol) | Monoalkyl Maleate (g) (mol) | Initiator (mol × $10^4$) | Polymer Composition Vinyl Acetate/Maleate wt %/wt % | Tg (°C.) | Yield/ Conversion (g) (%) |
|---|---|---|---|---|---|---|
| 1 | 40.0/0.47 | Monobutyl Maleate 10.3/0.052 | Lupersol 11[a] 2.07 | 80/20 | 46 | 33.7/69 |
| 2 | 34.0/0.39 | Monomethyl Maleate 6.0/0.096 | Trigonox 25-C-75[b] 3.09 | 80/20 | 58 | 33.1/83 |
| 3 | 48.0/0.56 | Monoethyl Maleate 12.0/0.083 | Trigonox 25-C-75[b] 4.49 | 65/35 | 65 | 38.4/64 |
| 4 | 42.0/0.49 | Monoethyl Maleate 18.0/0.13 | Trigonox 25-C-75[b] 6.13 | 48/52 | 95 | 30.9/52 |
| 5 | 36.0/0.42 | Monomethyl Maleate 24.0/0.18 | Trigonox 25-C-75[b] 1.51 | 43/57 | 106 | 40.3/67 |
| 6 | 42.0/0.49 | Monomethyl Maleate 24.0/0.14 | Trigonox 25-C-75[b] 7.51 | 57/43 | 87 | 39.5/66 |
| 7 | 36.0/0.42 | Monobutyl Maleate 27.84/0.4 | Trigonox 25-C-75[b] 6.69 | 62/38 | 54 | 42.0/70 |

[a]Lupersol 11 initiator is a hydrocarbon solution of t-butyl peroxyneodecanoate sold by Noury, Burt, N.Y.
[b]Trigonox 25-C-75 initiator is a hydrocarbon solution of t-butyl peroxypivalate sold by Pennwalt, Buffalo, N.Y.

EXAMPLE 8

PREPARATION OF A VINYL ACETATE/VINYL VERSATATE/MONOALKYL MALEATE TERPOLYMER BY SOLUTION POLYMERIZATION

Vinyl acetate (27.0 g, 0.31 mol), vinyl versatate (9.0 g, 0.045 mol) and monomethyl maleate (24.0 g, 0.18 mol) were mixed with Trigonox 23-C-75 initiator, a solution of tert-butyl peroxyneodecanoate, sold by Noury, Burt, New York, (0.4427 g of a 75% active solution, $1.34 \times 10^{-3}$ mol) in methanol (187 ml) and flushed with dry nitrogen. The mixture was heated to 60° C. under nitrogen for a period of 12 hours. The resulting terpolymer was precipitated in water. Following drying, the terpolymeric product (45.6 g, 76% conversion) was obtained having a Tg of 89° C. and a vinyl acetate/vinyl versatate/monomethyl maleate composition of 34/12/54 (wt %).

EXAMPLE 9 (COMPARATIVE)

PREPARATION OF A VINYL ACETATE/MALEIC ACID COPOLYMER

Vinyl acetate (64.00 g, 0.74 mol) and maleic acid (16.00 g, 0.14 mol) were mixed with Trigonox 23-C-75 initiator (0.5743 g of a 75% active solution, $1.76 \times 10^{-3}$ mol) in methanol (187 ml) and flushed with dry nitrogen. The mixture was heated under nitrogen at 60° C. for 18 hours. The resultant polymer was precipitated in water. Following drying, 24.59 g of the polymer was collected (31% yield). The copolymer contained 95 weight percent vinyl acetate units and 5 weight percent maleic acid units, as determined by $^{13}$C NMR.

EXAMPLE 10 (COMPARATIVE) PREPARATION OF A VINYL ACETATE/MALEIC ACID COPOLYMER

Vinyl acetate (56.00 g, 0.65 mol) and maleic acid (24.00 g, 0.21 mol) were mixed with Trigonox 23-C-75 initiator (0.5587 g of a 75% active solution, $1.71 \times 10^{-3}$ mol) in methanol (187 ml) and flushed with dry nitrogen. The mixture was heated under nitrogen at 60° C. for 18 hours. Volatiles were removed under vacuum and the resultant tacky solid was washed with water and dried to yield 11.80 g of polymer (15% conversion). The copolymer contained 50 weight percent vinyl acetate units and 50 weight percent maleic acid units, as determined by $^{13}$C NMR.

EXAMPLE 11

SOLUBILITY OF THE COPOLYMERS AND TERPOLYMERS ACCORDING TO EXAMPLES 1-8

The copolymers and terpolymers according to Examples 1 through 8 were tested to determined their solubilities in acidic, neutral and alkaline solutions. The screening experiments were conducted by immersing approximately 0.1 g (a $\frac{1}{2}'' \times \frac{1}{2}''$ piece of a 20 mil compression molded plaque) of the polymers in individual glass vials containing 15-20 g of 1.0, 5.0 and 10.0 wt % aqueous sodium carbonate ($Na_2CO_3$) solutions, respectively. The $Na_2CO_3$ solutions were prepared using distilled water. In addition, a similar 0.1 g sample of each polymer was placed in a vial containing only distilled water.

The weight loss (or uptake) and physical appearance of each film were periodically recorded. Since the experiments were conducted in relatively small vials, the physical changes did not occur at conditions of constant pH. The measurements were performed at room temperature under conditions of intermittent agitation. Table 2 summarizes the physical appearance and pH of each polymer/liquid mixture after an immersion time of approximately one month. Variations in the pH can be attributed to the approximate volume of solution and weight of polymer sample as well as the amount of carboxylic acid functionality in the polymer. The initial, clear $Na_2CO_3$ solutions had the following pH values:

| | |
|---|---|
| 1% $Na_2CO_3$ | 11.16 |
| 5% $Na_2CO_3$ | 11.34 |
| 10% $Na_2CO_3$ | 11.35 |

TABLE 2

AQUEOUS SOLUBILITY OF VINYL ACETATE/MONOALKYL MALEATE COPOLYMERS AS A FUNCTION OF pH

| RUN | EXAMPLE | COMPOSITION (WT %) | $Na_2CO_3$ Conc. [wt %] | pH | PHYSICAL APPEARANCE | Slope [min$^{-\frac{1}{2}}$] | Y-Intercept | Correlation Coefficient |
|---|---|---|---|---|---|---|---|---|
| 1-1 | 1 | 80% vinyl acetate, | 0 | 6.36 | White film, milky white-cloudy liquid | $1.81 \times 10^{-3}$ | $8.01 \times 10^{-3}$ | .945 |
| 1-2 | | 20% monobutyl maleate | 1 | 10.32 | Milky white-cloudy liquid | $1.93 \times 10^{-1}$ | $6.27 \times 10^{-2}$ | .982 |
| 1-3 | | | 5 | 10.78 | Milky white-cloudy liquid | $2.02 \times 10^{-1}$ | $4.09 \times 10^{-2}$ | .993 |
| 1-4 | | | 10 | — | White film, clear liquid | $1.87 \times 10^{-2}$ | $3.97 \times 10^{-1}$ | .853 |
| 2-1 | 2 | 80% vinyl acetate, | 0 | 6.08 | White film, cloudy liquid | $1.00 \times 10^{-2}$ | $-4.57 \times 10^{-2}$ | .980 |
| 2-2 | | 20% monomethyl maleate | 1 | 10.28 | Slightly milky-cloudy liq. | $2.65 \times 10^{-1}$ | $-9.18 \times 10^{-2}$ | .969 |
| 2-3 | | | 5 | 10.70 | Milky-cloudy liquid | $6.74 \times 10^{-2}$ | $5.69 \times 10^{-1}$ | .883 |
| 2-4 | | | 10 | 10.80 | White film, Slightly cloudy liquid | $5.30 \times 10^{-2}$ | $2.75 \times 10^{-1}$ | .953 |
| 3-1 | 3 | 65% vinyl acetate, 35% monoethyl maleate | 0 | 5.53 | White film, very slightly cloudy liquid | $2.39 \times 10^{-3}$ | $1.70 \times 10^{-2}$ | .968 |
| 3-2 | | | 1 | 10.24 | Dissolved, clear solution | * | | |
| 3-3 | | | 5 | 10.67 | Dissolved, clear solution | $-1.35 \times 10^{-1}$ | $3.47 \times 10^{-1}$ | .794 |
| 3-4 | | | 10 | 10.88 | Dissolved, clear solution | $-1.33 \times 10^{-1}$ | $1.84 \times 10^{-1}$ | .931 |
| 4-1 | 4 | 48% vinyl acetate, | 0 | 5.50 | White film, clear liquid | $2.93 \times 10^{-2}$ | $-8.27 \times 10^{-2}$ | .965 |
| 4-2 | | 52% monoethyl maleate | 1 | 10.33 | Dissolved, clear solution | $-1.22 \times 10^{-1}$ | $4.76 \times 10^{-2}$ | .983 |
| 4-3 | | | 5 | 10.65 | Dissolved, clear solution | $-1.83 \times 10^{-1}$ | $8.18 \times 10^{-4}$ | 1.000 |

TABLE 2-continued

AQUEOUS SOLUBILITY OF VINYL ACETATE/MONOALKYL MALEATE COPOLYMERS AS A FUNCTION OF pH

| RUN | EX-AMPLE | COMPOSITION (WT %) | $Na_2CO_3$ Conc. [wt %] | pH | PHYSICAL APPEARANCE | Slope [$min^{-\frac{1}{2}}$] | Y-Intercept | Correlation Coefficient |
|---|---|---|---|---|---|---|---|---|
| 4-4 | | | 10 | 10.90 | Dissolved, clear solution | $-1.69 \times 10^{-1}$ | $-8.96 \times 10^{-4}$ | 1.000 |
| 5-1 | 5 | 43% vinyl acetate 57% monomethyl maleate | 0 | 4.14 | White film w/LDI, clear liquid | $8.85 \times 10^{-3}$ | $3.75 \times 10^{-2}$ | .966 |
| 5-2 | | | 1 | 9.85 | Dissolved, clear solution | $-1.07 \times 10^{-1}$ | $3.62 \times 10^{-2}$ | .979 |
| 5-3 | | | 5 | 10.42 | Dissolved, clear solution | $-1.8 \times 10^{-1}$ | | |
| 5-4 | | | 10 | 10.43 | Dissolved, clear solution | $-1.08 \times 10^{-1}$ | $7.67 \times 10^{-2}$ | .914 |
| 6-1 | 6 | 57% vinyl acetate, 43% monomethyl maleate | 0 | 5.19 | White film w/LDI, clear liquid | $2.02 \times 10^{-2}$ | $-2.69 \times 10^{-2}$ | .991 |
| 6-2 | | | 1 | 10.31 | Dissolved, clear solution | $-1.21 \times 10^{-1}$ | $1.06 \times 10^{-1}$ | .898 |
| 6-3 | | | 5 | — | Dissolved, clear solution | $-1.41 \times 10^{-1}$ | $3.06 \times 10^{-2}$ | .986 |
| 6-4 | | | 10 | 10.88 | Dissolved, clear solution | $-1.40 \times 10^{-1}$ | $3.73 \times 10^{-2}$ | .980 |
| 7-1 | 7 | 62% vinyl acetate, 38% monobutyl maleate | 0 | 7.61 | Opaque film, clear liquid | $2.39 \times 10^{-3}$ | $3.07 \times 10^{-3}$ | .960 |
| 7-2 | | | 1 | 10.51 | Dissolved, clear solution | $-1.11 \times 10^{-1}$ | $3.29 \times 10^{-2}$ | .983 |
| 7-3 | | | 5 | 10.92 | Dissolved, clear solution | $-5.60 \times 10^{-2}$ | $9.87 \times 10^{-2}$ | .983 |
| 7-4 | | | 10 | 11.00 | Dissolved, clear solution | * | | |
| 8-1 | 8 | 34% vinyl acetate, 12% vinyl versatate, 54% monomethyl maleate | 0 | 4.71 | White film, clear liquid | $1.69 \times 10^{-2}$ | $-6.00 \times 10^{-2}$ | .972 |
| 8-2 | | | 1 | 9.96 | Dissolved, very slightly cloudy solution | $-1.08 \times 10^{-1}$ | $-2.97 \times 10^{-2}$ | .978 |
| 8-3 | | | 5 | 10.51 | Dissolved, very slightly cloudy solution | $-1.6 \times 10^{-1}$ | | |
| 8-4 | | | 10 | 10.69 | Dissolved, very slightly cloudy solution | $-1.02 \times 10^{-1}$ | $3.55 \times 10^{-2}$ | .965 |

* Polymer lost mechanical integrity
LDI: Large dimensional increase

As evidenced by the data, the pH of the distilled water varied with measurement conditions and batch of water tested. In general, the polymers exhibited the most rapid physical changes in the 1% $Na_2CO_3$ solutions. Polymers which did not dissolve generally turned white and were accompanied by large increases in dimension and sometimes by a loss in mechanical integrity. Each film was blotted dry and weighed periodically during the experiment. The film weight data were normalized with respect to their initial weights and plotted versus immersion time to the one half power ($t^{\frac{1}{2}}$) for each polymer and solution concentration. The analytical method used is consistent with principles regarding the mathematics of diffusion into a plane sheet as discussed by J. Crank, *The Mathematics of Diffusion*, 2nd ed., Oxford University Press, Chapter 4, 1975.

A linear regression analysis was performed on the normalized film weight-immersion time data which are summarized in Table 2. A negative slope indicates polymer dissolution while a positive slope indicates swelling. The magnitude of the coefficient represents the speed with which the polymer film weight increases or decreases over time. Slopes of the order $10^{-5}$ and less represent almost no weight gain on a time scale of weeks. For polymers which first swelled and then dissolved, this analysis was not appropriate and was not performed. Moreover, for the polymers which lost their mechanical integrity, film weight data could not be obtained.

The results according to Table 2 demonstrate that copolymers of vinyl acetate and monomethyl maleate (Runs 5-1 through 5-4 and Runs 6-1 through 6-4); monoethyl maleate (Runs 3-1 through 3-4 and Runs 4-1 through 4-4); and monobutyl maleate (Runs 7-1 through 7-4) provide selectively soluble protective coatings wherein such coatings are insoluble in an acidic aqueous solution but which are swellable and dissolvable upon being subjected to an alkaline aqueous solution.

EXAMPLE 12

AQUEOUS SOLUBILITY OF VINYL ACETATE/MONOALKYL MALEATE COPOLYMERS

The dissolution rates for copolymers of vinyl acetate and various monoalkyl maleates were studied as a function of pH of the sodium carbonate solution used to solubilize the copolymeric film sample. The experiments were conducted at 25° C. according to the general procedure enumerated in Example 11. Larger solution volumes were used to minimize the change in pH caused during dissolution of the copolymeric sample film into the sodium carbonate solution. Specifically, 0.1 g of the copolymers according to Examples 4, 5, 6 and 7 were immersed in 125 g of 0.1, 0.5 and 1.0 wt % $Na_2CO_3$ solutions (in distilled water). The overall rates of dissolution were calculated by dividing the initial weight of the film by the time required for dissolution. The results are presented in Table 3.

TABLE 3
DISSOLUTION RATES OF VINYL ACETATE/MONOALKYL MALEATE COPOLYMERS AS A FUNCTION OF $Na_2CO_3$ SOLUTION CONCENTRATION

| Run | Example | Polymer Composition (wt %) | Dissolution Rates @ 25° C. [g/min] | | |
|---|---|---|---|---|---|
| | | | 0.1% $Na_2CO_3$ | 0.5% $Na_2CO_3$ | 1.0% $Na_2CO_3$ |
| 9 | 4 | Vinyl acetate Monoethyl Maleate (48/52) | $0.85 \times 10^{-3}$ | $3.85 \times 10^{-3}$ | $5.24 \times 10^{-3}$ |
| 10 | 5 | Vinyl acetate Monomethyl Maleate (43/57) | $1.57 \times 10^{-3}$ | $3.25 \times 10^{-3}$ | $6.53 \times 10^{-3}$ |
| 11 | 6 | Vinyl acetate Monomethyl Maleate (57/43) | $1.18 \times 10^{-3}$ | $4.14 \times 10^{-3}$ | $4.80 \times 10^{-3}$ |
| 12 | 7 | Vinyl acetate Monobutyl Maleate (62/38) | $1.14 \times 10^{-3}$ | $4.93 \times 10^{-3}$ | $1.04 \times 10^{-2}$ |

EXAMPLE 13 (COMPARATIVE)

SOLUBILITY COMPARISON OF VINYL ACETATE/MONOALKYL MALEATE COPOLYMERS AND VINYL ACETATE/MALEIC ACID COPOLYMERS

Utilizing the procedure enumerated in Example 12, approximately 0.12 g of two vinyl acetate/maleic acid copolymers (Examples 9 and 10), a vinyl acetate/monoethyl maleate copolymer (Example 3) and a vinyl acetate/monomethyl mates copolymer (Example 5) were placed in glass vials containing 50 ml of distilled water and 1.0 wt % sodium carbonate solution (in distilled water), respectively. Observations were recorded as a function of immersion time. The solubility results of the various polymers after 45 minutes of immersion are reported in Table 4.

TABLE 4
(Comparative)
SOLUBILITY COMPARISON OF VINYL ACETATE/ MONOALKYL MALEATE COPOLYMERS AND VINYL ACETATE/MALEIC ACID COPOLYMERS

| Run | Example | Polymer Composition (wt %) | Sample Solubility | |
|---|---|---|---|---|
| | | | Distilled Water | 1.0 wt % $Na_2CO_3$ |
| 13 | 3 | Vinyl acetate Monoethyl maleate (65/35) | Insoluble | Sample Swollen Partial Dissolution |
| 14 | 5 | Vinyl acetate Monomethyl maleate (43/57) | Insoluble | Complete Dissolution |
| 15 | 9 | Vinyl acetate Maleic acid (95/5) | Insoluble | Insoluble |
| 16 | 10 | Vinyl acetate Maleic acid (50/50) | Sample Swollen | Partial Dissolution |

Runs 15 and 16 demonstrate that the two vinyl acetate/maleic acid copolymers failed to exhibit the selective solubility characteristic of the copolymers of the claimed compositions. More particularly, Run 15 was insoluble in both distilled water and the 1.0 wt % sodium carbonate solution and Run 16 was soluble in both distilled water and the 1.0 wt % sodium carbonate solution. In contrast, the vinyl acetate/monoalkyl maleate copolymers of the present invention (Runs 13 and 14) were insoluble in distilled water and either partially or totally dissolved in a 1.0 wt % sodium carbonate solution. Runs 13 and 14 demonstrate that those skilled in the art can easily tailor the claimed compositions to provide the desired properties by choosing a particular monoalkyl maleate and the relative proportion of vinyl acetate and monoalkyl maleate to control dissolution rate of the protective coating and the strength of alkali solution required to remove the film.

The compositions according to the claimed invention provide useful protective coatings exhibiting improved resistance to neutral aqueous solutions which can be removed at the desired time by treatment with aqueous alkali solutions. Moreover, the protective coatings deposited form the disclosed compositions demonstrate improved selective solubility over the protective coatings disclosed in the art.

Having thus described the present invention, what is now deemed appropriate for Letters Patent is set out in the following appended claims.

We claim:

1. A composition suitable for forming a temporary, selectively soluble protective coating upon a substrate, wherein the protective coating is substantially insoluble in an aqueous acidic solution while being capable of removal of dissolution in an aqueous alkaline solution, the composition consisting of a vehicle having dispersed therein a copolymer consisting of 35 to 80 weight percent vinyl acetate and from 20 to 65 weight percent of a monoalkyl maleate represented by the formula:

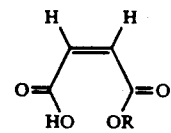

wherein R is selected from a primary, secondary or tertiary alkyl having from 1 to 4 carbon atoms.

2. The composition according to claim 1 wherein from 5 to 65 weight percent of the copolymer is dispersed in the vehicle.

3. The composition according to claim 2 wherein the vehicle is an alcohol having from 1 to about 6 carbon atoms.

4. The composition according to claim 3 wherein the vehicle is methanol.

5. A composition suitable for depositing a temporary, selectively soluble protective coating upon a substrate, wherein the protective coating is substantially insoluble in an aqueous acidic solution while being capable of removal by dissolution in an aqueous alkaline solution, the composition consisting essentially of a vehicle having dispersed therein a copolymer consisting of 50 to 80 weight percent vinyl acetate and from 20 to 50 weight percent of a monoalkyl maleate selected from monomethyl maleate, monomethyl maleate or mono-n-butyl maleate.

6. The composition according to claim 5 wherein from 20 to 45 weight percent of the copolymer is dispersed in the vehicle.

7. The composition according to claim 6 wherein the vehicle is an alcohol having from 1 to about 6 carbon atoms.

8. The composition according to claim 3 wherein the vehicle is methanol.

9. A composition suitable for depositing a temporary, selectively soluble protective coating upon a substrate, wherein the protective coating is substantially insoluble in an aqueous acidic solution while being capable of removal by dissolution in an aqueous alkaline solution, the composition consisting essentially of a vehicle having dispersed therein a copolymer consisting of 50 to 80 weight percent vinyl acetate and from 20 to 50 weight percent monomethyl maleate.

10. The composition according to claim 9 wherein from 20 to 45 weight percent of the copolymer is dispersed in the vehicle.

11. The composition according to claim 10 wherein the vehicle is an alcohol having from 1 to about 6 carbon atoms.

12. The composition according to claim 11 wherein the vehicle is methanol.

* * * * *

UNITED STATES PATENT AND TRADEMARK OFFICE
CERTIFICATE OF CORRECTION

PATENT NO. : 5,147,924

DATED : September 15, 1992

INVENTOR(S) : Dennis Sagl and Menas S. Vratsanos

It is certified that error appears in the above-identified patent and that said Letters Patent is hereby corrected as shown below:

In the Claims:

Column 14, line 11, delete "essentially".

Signed and Sealed this

Fifth Day of October, 1993

Attest:

BRUCE LEHMAN

Attesting Officer

Commissioner of Patents and Trademarks